(12) United States Patent
Cannon et al.

(10) Patent No.: US 6,713,001 B1
(45) Date of Patent: Mar. 30, 2004

(54) SURFACE IMAGING METHOD FOR A VEHICLE SEAT

(75) Inventors: Carter Cannon, Southfield, MI (US); John P. Slaven, Harper Woods, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 08/999,497

(22) Filed: Dec. 29, 1997

(51) Int. Cl.$^7$ ............................................. B29C 33/38
(52) U.S. Cl. ........................ 264/40.1; 264/222; 264/102; 425/2
(58) Field of Search .............................. 264/40.1, 222, 264/DIG. 30, 102, DIG. 78; 425/2

(56) References Cited

U.S. PATENT DOCUMENTS

| | | | |
|---|---|---|---|
| 3,830,896 A | * | 8/1974 | Flicker et al. ............... 264/45 |
| 4,327,046 A | | 4/1982 | Davis et al. |
| 4,347,213 A | * | 8/1982 | Rogers, Jr. .................. 264/510 |
| 4,575,805 A | * | 3/1986 | Moermann et al. .......... 364/474 |
| 4,821,200 A | * | 4/1989 | Oberg ..................... 364/474.24 |
| 5,159,726 A | | 11/1992 | Bloch et al. |
| 5,432,703 A | * | 7/1995 | Clynch et al. .......... 364/474.05 |
| 5,633,494 A | * | 5/1997 | Danisch .................. 250/227.16 |

OTHER PUBLICATIONS

International Search Report.
Measurand Inc., "Fiber Optic Shape Sensors™, Shape Tape™ and Liquid Level Sensors", booklet.
Measurand Inc., "Your Source For Practical Fiber Optic Sensors" brochure.

* cited by examiner

Primary Examiner—Suzanne E. McDowell
(74) Attorney, Agent, or Firm—Bill C. Panagos

(57) ABSTRACT

A method of imaging a vehicle occupant's body position at the interface between the vehicle occupant and a vehicle seating surface includes positioning a pressure-actuated, controlled-rigidity support bag at the interface between the vehicle occupant and the vehicle seating surface. A vacuum pressure is then created within the pressure-actuated, controlled-rigidity support bag to conform the bag to the contour of the interface between the vehicle occupant and the vehicle seating surface. The conformed bag is then imaged to determine the contour of the interface, thereby determining the vehicle occupant's body position on the vehicle seating surface. With this method, comfort studies may be more efficiently performed, and vehicle seat shells for race car drivers more efficiently manufactured.

11 Claims, 4 Drawing Sheets

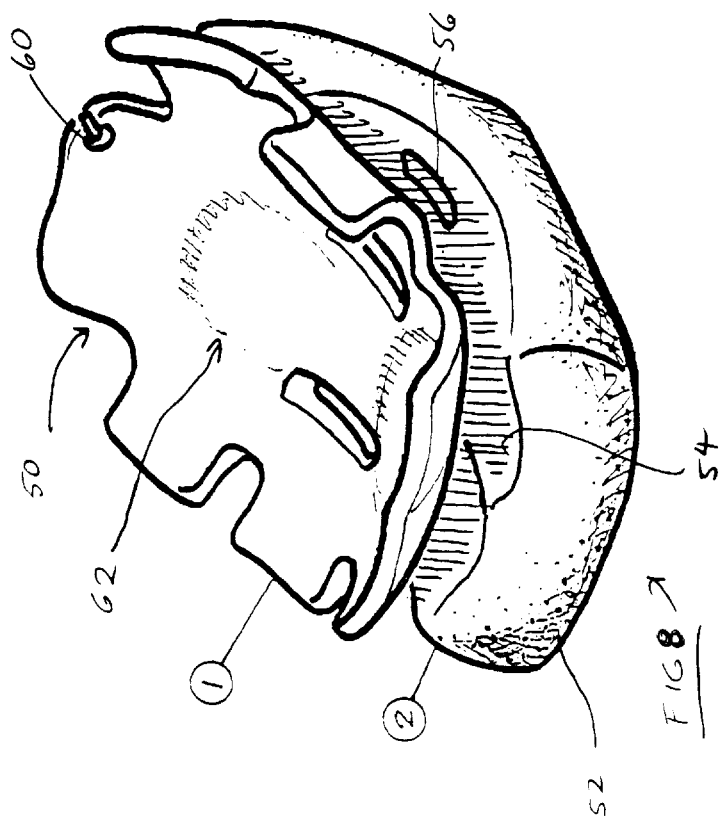
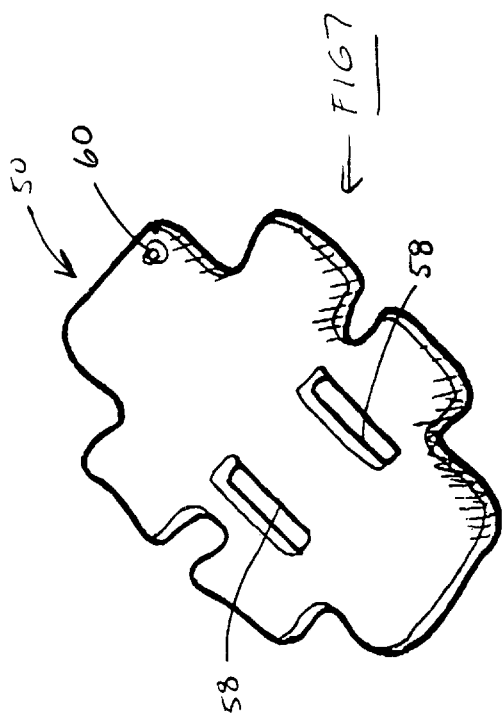

SURFACE IMAGING METHOD FOR A VEHICLE SEAT

TECHNICAL FIELD

The present invention relates to a surface imaging method, and more particularly to a surface imaging method for determining occupant body position on a vehicle seat and for use in manufacturing a race car driver body support shell.

BACKGROUND OF THE INVENTION

Vehicle seat comfort studies are a very important step in the design of a vehicle seat for manufacture. In the design, it is important to understand the range of body positions which differently sized vehicle occupants will occupy on a vehicle seat. Occupant body position ranges are important in establishing overall seat design for comfort and functionality.

Typically, comfort studies are performed by positioning a variety of differently sized vehicle occupant test subjects or test dummies on a seating surface and physically measuring the position of different parts of the test subject's body, such as the shoulders, knees, elbows, etc. in order to estimate the body position at the interface between the body and the seating surface. Alternatively, pressure sensors are placed in the seat for sensing pressure applied by the various test subjects in order to extrapolate the various body positions of the vehicle occupants at the interface between the test subjects and the vehicle seating surface.

These processes are typically labor-intensive and costly, and, therefore, improvements in efficiency are desirable.

Another prior art problem addressed by the present invention is that associated with the seating of race car drivers in a race car. It is desirable to provide a polymeric shell which snugly fits the driver's body as the driver is seated within the race car. Currently, the best known method for manufacturing such a polymeric shell which conforms closely to the contour of the driver's body is to position the driver on a flexible plastic bag in the seated position, and pouring foam into the bag. The foam expands to conform to the contour of the driver's body and solidifies. The conformed foam is then removed from the race car seating compartment and the contoured surface of the foam is used as a master or splash to fabricate a polymeric shell for the driver. This method is problematic because it is labor-intensive and time-consuming, and does not allow capability of adjustments in different areas of the contoured seating shell. Minor changes in the contour of the shell require repeating the entire process. Accordingly, improvements in this process are desirable.

DISCLOSURE OF THE INVENTION

The present invention overcomes the above-referenced shortcomings of prior art methods of determining vehicle occupant body position in a seat, and of forming vehicle seating shells for race car drivers, by laying a pressure-actuated, controlled-rigidity support bag, such as that described in U.S. Pat. No. 5,159,726, on the seating surface and positioning the vehicle occupant or race car driver in a seated position on top of the support bag. A vacuum is then created within the support bag which causes the support bag to maintain the contour of the interface formed between the vehicle occupant and the vehicle seating surface. This conformed bag may then be used for imaging of the vehicle occupant's body position within the seat or it may be used as a scanning medium for creating a vehicle seat shell for a race car driver.

More specifically, the present invention provides a method of imaging a vehicle occupant's body position at the interface between the vehicle occupant and a vehicle seating surface. The method includes positioning a pressure-actuated, controlled-rigidity support bag at the interface between the vehicle occupant and the vehicle seating surface. A vacuum pressure is created within the pressure-actuated, controlled-rigidity support bag to conform the bag to the contour of the interface between the vehicle occupant and the vehicle seating surface. The conformed bag is then imaged to determine the contour of the interface, thereby determining the vehicle occupant's body position on the vehicle seating surface.

The terms "imaging" or "imaged" as used herein refer to any use of the contoured image which is formed in the support bag, such as scanning the contoured surface, using the contoured surface to create an image, molding a material in the shape of the contoured surface, etc.

This method provides a substantial improvement over the methods described previously with respect to the prior art. Substantial labor and cost requirements are reduced over the prior art processes of vehicle occupant body position imaging and race car driver body shell manufacture, and a large measure of flexibility is achieved.

Accordingly, an object of the present invention is to provide a method of imaging a vehicle occupant's body position at the interface between the vehicle occupant's body and a vehicle seating surface in which labor and cost requirements are substantially reduced.

Another object of the invention is to provide a method of imaging a vehicle occupant's body position on a vehicle seat which is easily and quickly repeatable.

A further object of the invention is to provide a method of imaging the contour of a race car driver's body in a seated position within a race car which is quick and does not require molding of foam around a seated driver.

These objects and other objects, features and advantages of the present invention are readily apparent from the following detailed description of the best modes for carrying out the invention when taken in connection with the accompanying drawings.

BRIEF DESCRIPTION OF THE DRAWINGS

FIG. 7 shows a perspective view of a support bag for use in a race car in accordance with an alternative embodiment of the invention;

FIG. 8 shows an exploded perspective view of a race car support cushion and support bag of FIG. 7 carrying the image of a driver.

DETAILED DESCRIPTION OF THE PREFERRED EMBODIMENTS

The present invention provides a method of imaging a vehicle occupant's body position at the interface between the vehicle occupant and a vehicle seating surface. This imaging may be used in a vehicle seat comfort study, or in manufacturing a race car driver shell which conforms closely to the contours of the driver's body.

Specifically, a first aspect of the invention provides a method of imaging a vehicle occupant's body position at the interface between the vehicle occupant and a vehicle seating surface, comprising:

A) positioning a pressure-actuated, controlled-rigidity support bag at the interface between the vehicle occupant and the vehicle seating surface;

B) creating a vacuum pressure within the pressure-actuated, controlled-rigidity support bag to conform the bag to the contour of the interface between the vehicle occupant and the vehicle seating surface; and C) imaging the conformed bag to determine the contour of the interface, thereby determining the vehicle occupant's body position on the vehicle seating surface.

Figure 1:
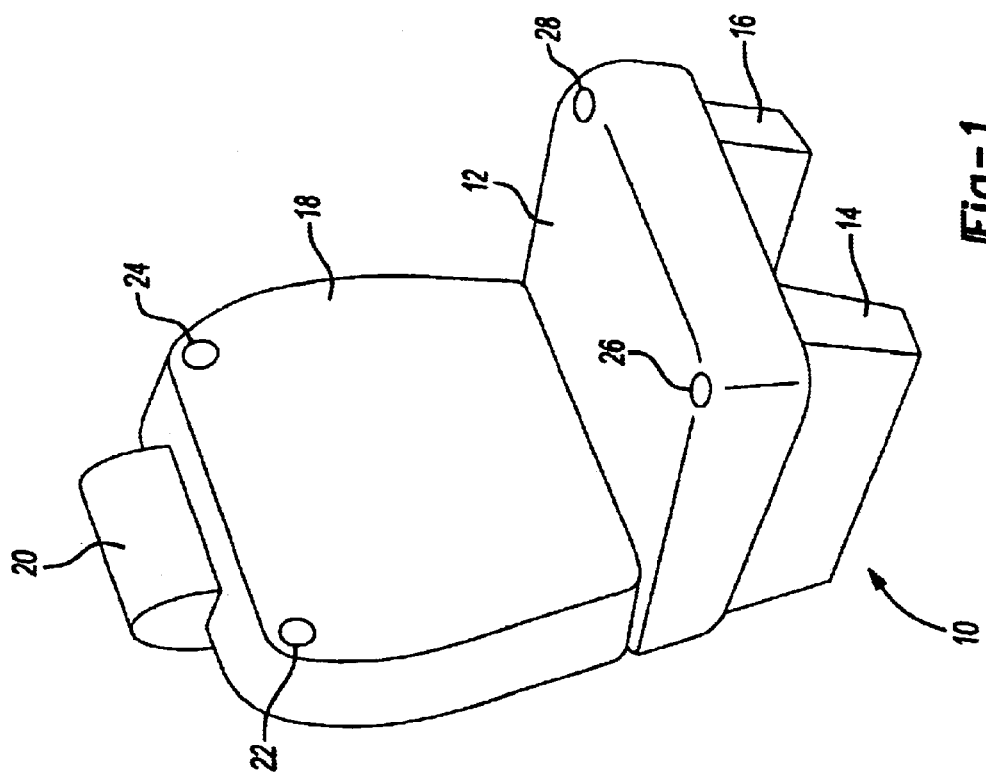
FIG. 1 shows a perspective view of a conventional automotive seat.

The first aspect of the invention is more clearly understood with reference to FIGS. 1–6. FIG. 1 shows a conventional vehicle seat 10. The vehicle seat 10 comprises a lower seat 12 supported in a vehicle on a pair of risers 14,16. A seat back 18 extends upwardly from the lower seat 12, and includes a head rest portion 20.

Figure 2:
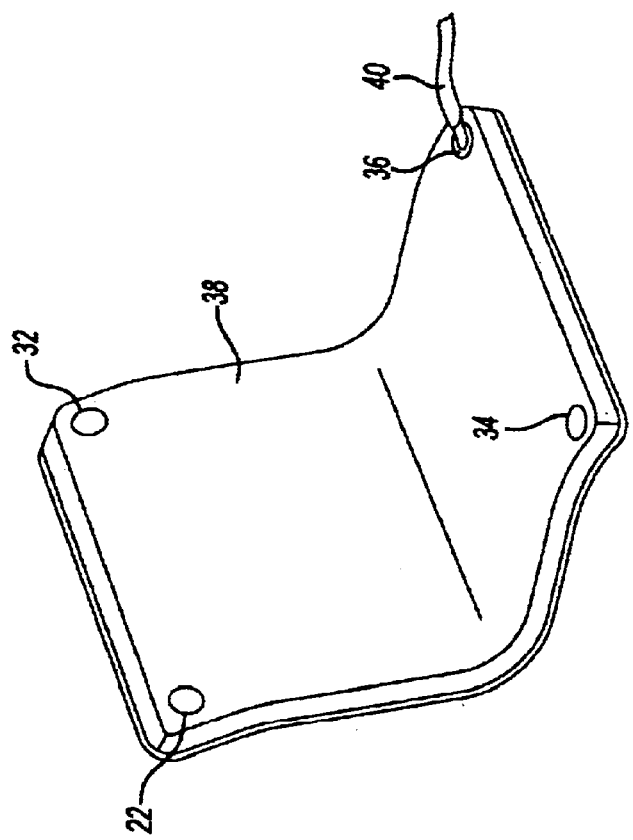
FIG. 2 shows a perspective view of a support bag for use with the present invention.

By way of example, the vehicle seat 10 includes attachment features 22, 24, 26, 28 for cooperating, respectively, with attachment features, 30, 32, 34, 36 of a support bag 38, shown in FIG. 2, as the support bag 38 is laid over and attached to the lower seat 12 and seat back 18 of the vehicle seat 10. The support bag 38 is, preferably, a pressure-actuated, controlled-rigidity support bag, as described in U.S. Pat. No. 5,159,726, which is hereby incorporated by reference in its entirety.

In general, the support bag 38 comprises an outer cover and in inner filler which, when a vacuum pressure is applied within the outer cover, causes the support bag to retain any contoured shape to which the support bag has been bent. The filler consists of a flexible laminated structure, the various strata of which may displace relative to each other under the affect of a non-uniform distribution of force compressing the filler in the absence of any control pressure. When a vacuum pressure is applied, relative displacement between the various strata is eliminated, which provides the support bag with a rigid structure as long as the vacuum pressure is maintained.

The filler within the support bag 28 consists of an assembly of pliable and flexible sheets which can be deformed by a non-uniform distribution of a compressive force. By way of example, the sheets may be paper, textile, plastic or metal which are capable of relative displacement under the effective deformation and the physical properties (texture, thickness, co-efficient or friction) of which are adapted to the qualities of rigidity required for the particular application. The rigidity is obtained by immobilizing the seats under pressure by friction forces to achieve an embedding or locking effect.

The sheets may have different properties and exhibit a surface with protrusions or spikes which can be engaged in recesses or meshes of the grid on an adjacent sheet. The sheets may also have perforations, be cut away or possess rigidification elements in order to facilitate the application of the pressure vacuum within the outer cover, to increase the rigidity of the filler, to improve the cohesion between the sheets or to avoid the formation of wrinkles.

For the application herein described with reference to the first aspect of the present invention, a thin support bag configuration is most desirable.

As shown in FIG. 2, the support bag 38 is provided in communication with a hose 40 for providing the vacuum pressure within the support bag 38.

Figure 3:
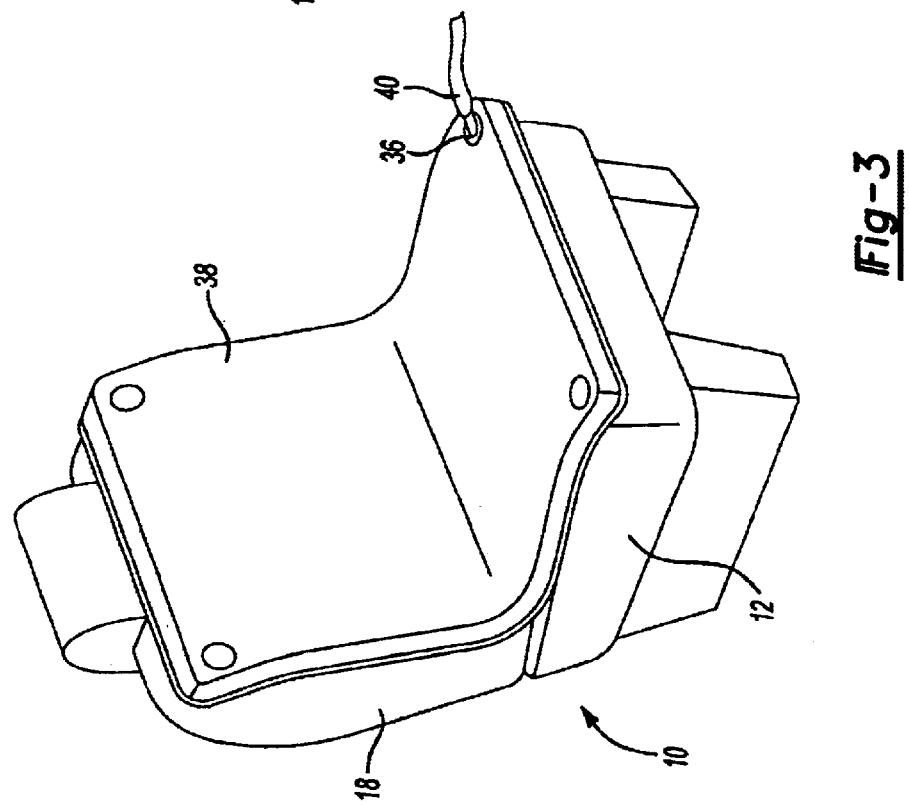
FIG. 3 shows a perspective view of the conventional seat of FIG. 1 with the support bag of FIG. 2 placed thereon.

Turning to FIG. 3, the support bag 38 is shown overlaid across the lower seat 12 and seat back 18 of the vehicle seat 10. At this point, no vacuum pressure exists within the support bag 38, and the support bag 38 is, accordingly, deformable under a non-uniform distribution of forces.

Figure 4:
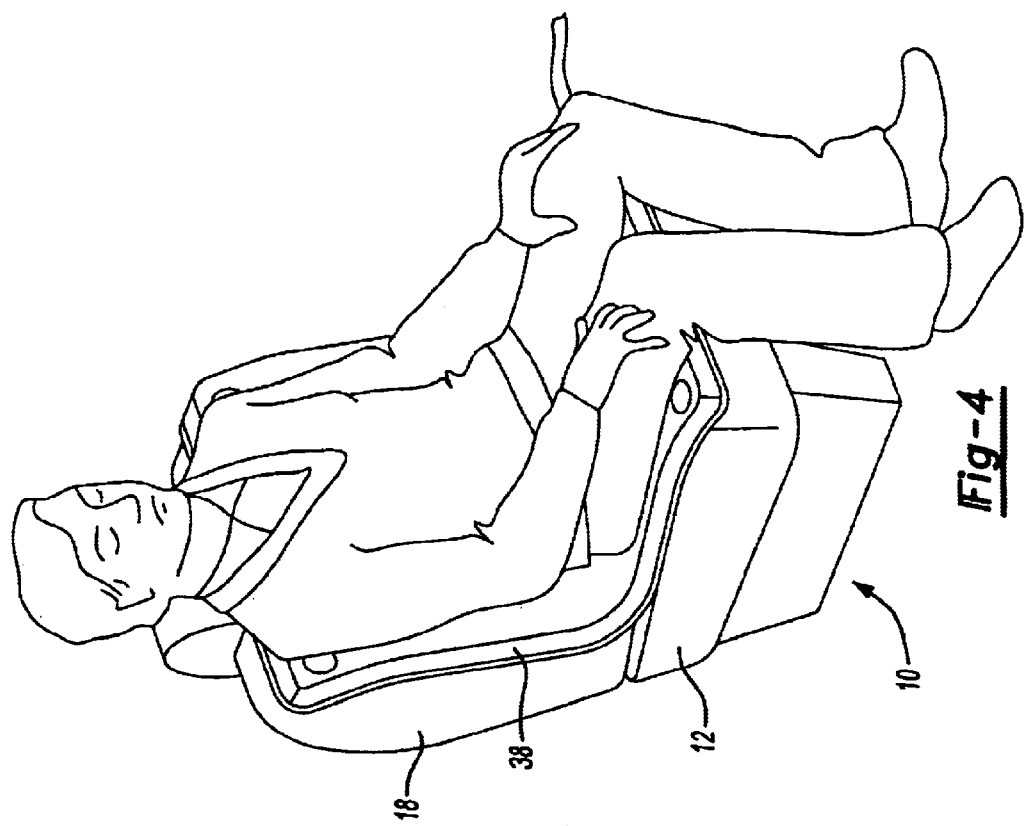
FIG. 4 shows a perspective view of the vehicle seat and support bag of FIG. 3 with the vehicle occupant sitting on the seat while the support bag is capturing his image.

Turning to FIG. 4, an occupant is shown in a seated position over the support bag 38. With the occupant in this seated position, as shown in FIG. 4, a vacuum pressure is applied within the support bag 38 through the hose 40, thereby causing the support bag 38 to rigidly conform to the contour of the interface between the occupant and the vehicle seating surface.

Figure 6:
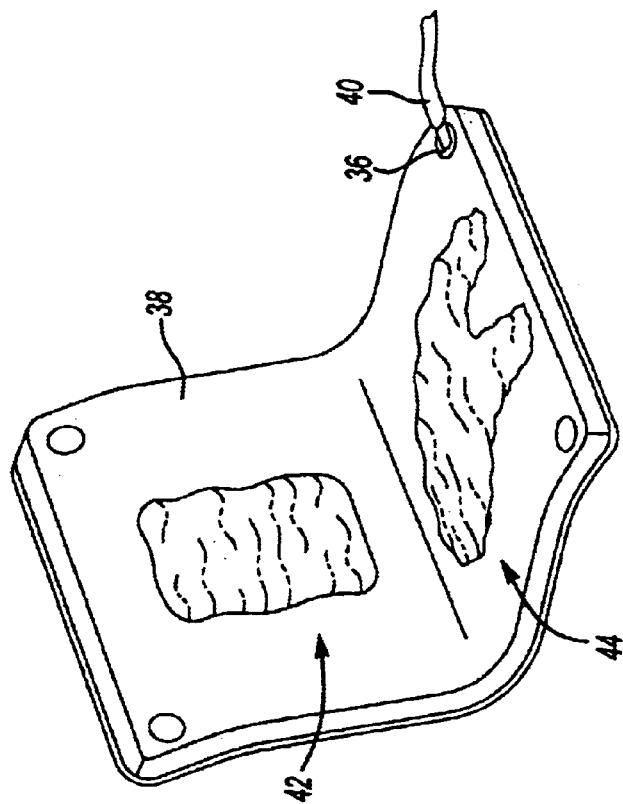
FIG. 6 shows a perspective view of the support bag with the image of the vehicle occupant captured thereon.
Figure 5:
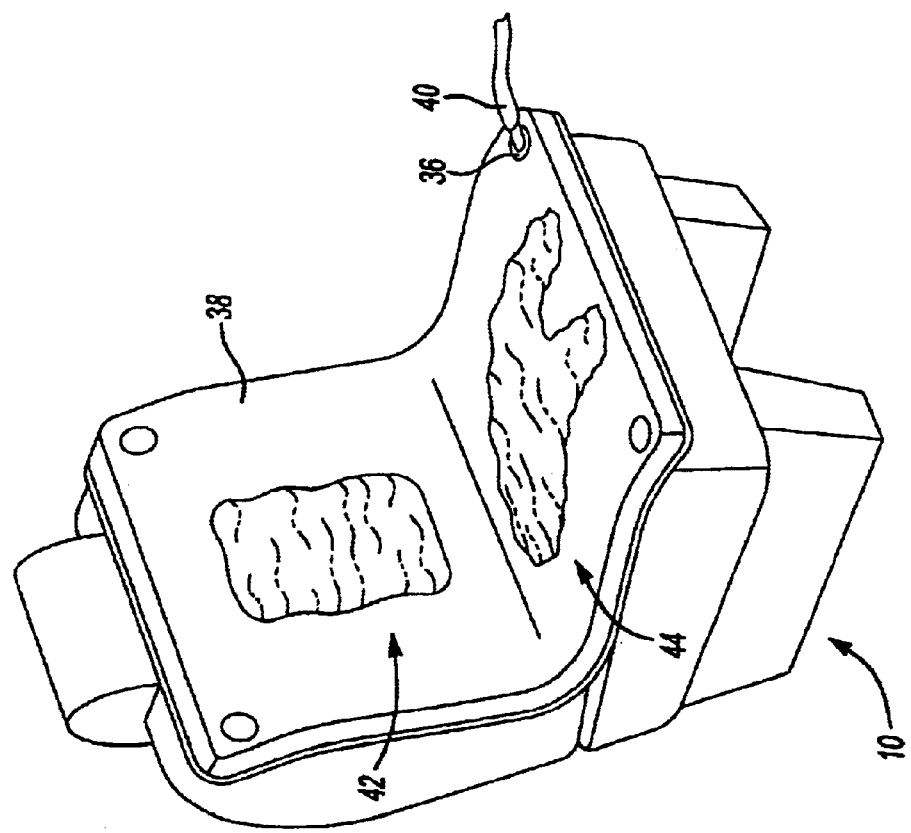
FIG. 5 shows a perspective view of the support bag and seat after the vehicle occupant has left an impression on the support bag.

Turning to FIG. 5, with the vacuum pressure maintained within the support bag 38, the vehicle occupant may move away from the seat 10, leaving an image 42,44 in the support bag 38. With the vacuum pressure maintained within the support bag 38, the support bag 38 may be removed from the seat 10, as shown in FIG. 6, and the image 42,44 of the interface between the vehicle occupant and the vehicle seating surface remains in the support bag 38.

Accordingly, with the image of the interface between the vehicle occupant and the vehicle seating surface preserved, the surface of the support bag 38 may be imaged in order to determine the vehicle occupant's body position on the vehicle seating surface. This technique is extremely effective in vehicle seat comfort studies, and a substantial improvement over prior art methods described previously.

In order to reuse the support bag 38, the vacuum pressure is simply removed from the support bag 38, and the above-described steps are repeated. In order to perform a comfort study, a variety of differently sized vehicle occupant test subjects may be seated upon the seat over the support bag, and the contoured image left in the support bag at the interface between the test subject's body and the vehicle seating surface may be imaged in order to determine the variety of body positions differently sized vehicle occupants will occupy on a particular seat design.

The present invention contemplates one such imaging method as providing a plurality of sensors integrated into the laminate construction within the support bag 38. The sensors may relay information to a computer monitor in the form of points (x, y, z) in relation to a given common datum in the subject seat. Alternatively, the sensors may be read by the computer as lines, wire frame or sections with a given common datum in the subject seat. Also, prior to the vacuum being activated with the subject sitting in the seat, images may be relayed to the computer in real time, and can be frozen. With the occupant out of the seat, the support bag will retain its shape and information can continue to be relayed to the computer.

The preferred sensor is a Fiber Optic Shape Sensor™ or Shape Tape™, such as that available from Measurand Inc. of Fredericton, New Brunswick, Canada, as described in U.S. Pat. Nos. 5,321,257 and 5,633,494, which are hereby incorporated by reference. These products are used to determine the contour of the surface or to determine the location of different points on the surface.

In some applications, it may be desirable to provide multiple segmented areas of the bag with differing hardness and rigidity.

Turning to FIGS. 7 and 8, an alternative embodiment of the present invention is shown. This embodiment provides a method of imaging body position of a race car driver in a seated position within the car. The support bag 50 is used as a scanning medium for taking a contour image of the driver as the driver is in a seated position within the car.

As shown in FIG. 8, the race car driver's compartment is provided with a seating cushion 52, which is usually a bean bag or air-bladder type device which forms a vehicle seating surface 54, which supports the driver. The cushion 52 is provided with apertures 56 for seat belt installation, and corresponding apertures 58 are provided in the support bag 50. As shown, the support bag 50 includes a valve 60 for application of a vacuum pressure within the bag 50. Again, the bag 50 is, preferably, a pressure-actuated, controlled-rigidity support bag. The bag 50 is shaped to conform appropriately to a contour which would support the driver's body in a seated position in the race car.

As shown in FIG. 8, when a driver is seated over the bag 50 on the cushion 52, and a vacuum pressure is applied through the valve 60, the bag 50 conforms to the contour of the interface between the driver's body and the vehicle seating surface 54. Accordingly, an image 62 is maintained in the support bag 50 after the driver has exited the vehicle and the vacuum pressure is maintained within the bag 50.

With the bag 50 conformed to the contour of the interface between the vehicle driver's body and the vehicle's seating surface 54, a quick setting polymer resin may be applied against the conformed bag 50 to form a vehicle seat occupant support shell. Alternatively, a molten resin may be communicated with the conformed bag such that the vacuum pressure within the bag 50 draws the molten resin into the conformed bag to form a properly contoured vehicle occupant body support shell. In such an arrangement, a glass fiber or scrim material will be provided within the bag for structurally supporting the cured resin. The present invention contemplates that the bag 50 could be a double bag, or multiple-segmented bag in which the glass and resin are separated from the friction strips.

While the best modes for carrying out the invention have been described in detail, those familiar with the art to which this invention relates will recognize various alternative designs and embodiments for practicing the invention within the scope of the appended claims.

What is claimed is:

1. A method of imaging a vehicle occupant's body position at the interface between the vehicle occupant and a vehicle seating surface, comprising:

positioning a pressure-actuated, controlled-rigidity support bag at the interface between the vehicle occupant and the vehicle seating surface, wherein said bag comprises a filler comprising an assembly of pliable and flexible laminated friction strips which can be deformed therein;

creating a vacuum pressure within said pressure-actuated, controlled-rigidity support bag to conform the bag to the contour of the interface between the vehicle occupant and the vehicle seating surface and to frictionally engage said laminated friction strips so that the bag maintains said contour and inherently exhibits shape memory characteristics such that the bag may be pliable bent and automatically returns to the shape of said contour when released; and imaging the conformed bag to determine the contour of the interface, thereby determining the vehicle occupant's body position on the vehicle seating surface.

2. The method of claim 1, further comprising applying a quick-setting polymer resin against the conformed bag to form a vehicle occupant support shell.

3. The method of claim 1, further comprising:

releasing the vacuum pressure from within said conformed bag; and repeating said steps of positioning, creating a vacuum and imaging the conformed bag.

4. The method of claim 1, wherein said step of positioning the support bag at the interface between the vehicle occupant and the vehicle seating surface comprises placing the support bag against a vehicle seat and positioning the vehicle occupant in a seated position on the support bag.

5. The method of claim 1, wherein said step of positioning the support bag at the interface between the vehicle occupant and the vehicle seating surface comprises placing the support bag on a vehicle seating cushion and positioning the vehicle occupant in a seated position on the support bag.

6. The method of claim 1, further comprising communicating a molten resin with said conformed bag such that said vacuum pressure draws the molten resin into the conformed bag to form the contoured shape of the conformed bag to form a vehicle occupant body support shell.

7. A method of imaging a vehicle occupant's body position at the interface between the vehicle occupant and a vehicle seating surface, comprising:

positioning a pressure-actuated, controlled-rigidity support bag against a vehicle seat and positioning the vehicle occupant in a seated position on the support bag, wherein said bag comprises a filler comprising an assembly of pliable and flexible laminated friction strips which can be deformed therein;

creating a vacuum pressure within said pressure actuated, controlled-rigidity support bag to conform the bag to the contour of the interface between the vehicle occupant and the vehicle seat and to frictionally engage said laminated friction strips so that the bag maintains said contour and inherently exhibits shape memory characteristics such that the bag may be pliable bent and automatically returns to the shape of said contour when released; and imaging the conformed bag to determine the contour of the interface, thereby determining the vehicle occupant's body position on the vehicle seat.

8. A method of imaging a vehicle occupant's body position at the interface between the vehicle occupant and the vehicle seating surface, comprising:

positioning a pressure-actuated, controlled-rigidity support bag on a vehicle seating cushion and positioning the vehicle occupant in a seated position on the support bag, wherein said bag comprises a filler comprising an assembly of pliable and flexible laminated friction strips which can be deformed therein;

creating a vacuum pressure within said pressure-actuated, controlled-rigidity support bag to conform the bag to the contour of the interface between the vehicle occupant and the vehicle seating cushion and to frictionally engage said laminated friction strips so that the bag maintains said contour ad inherently exhibits shape memory characteristics such that the bag may be pliably bent and automatically returns to the shape of said contour when released; and imaging the conformed bag to determine the contour of the interface, thereby determining the vehicle occupant's body position on the vehicle seating surface.

9. The method of claim 8, further comprising applying a quick-setting polymer resin against the conformed bag to form a vehicle occupant support shell.

10. The method of claim 8, further comprising:

releasing the vacuum pressure from within said conformed bag; and repeating said steps of positioning, creating a vacuum and imaging the conformed bag.

11. The method of claim 8, further comprising communicating a molten resin with said conformed bag such that said vacuum pressure draws the molten resin into the conformed bag to form the contoured shape of the conformed bag to form a vehicle occupant body support shell.

* * * * *